United States Patent
Kendrick

Patent Number: 5,085,550
Date of Patent: Feb. 4, 1992

[54] LOCKING NUT ASSEMBLY

[76] Inventor: Thomas J. Kendrick, 29, Mount Road, Wombourne, Staffordshire, United Kingdom

[21] Appl. No.: 573,320
[22] PCT Filed: Mar. 28, 1989
[86] PCT No.: PCT/GB89/00331
§ 371 Date: Oct. 26, 1990
§ 102(e) Date: Oct. 26, 1990
[87] PCT Pub. No.: WO89/09344
PCT Pub. Date: Oct. 5, 1989

[30] Foreign Application Priority Data

Mar. 31, 1988 [GB] United Kingdom ............... 8807677

[51] Int. Cl.$^5$ ..................... F16B 37/08; F16B 39/22
[52] U.S. Cl. ..................... 411/432; 411/156; 411/278; 411/533
[58] Field of Search ............ 411/155, 156, 277, 278, 411/368, 369, 432, 533, 917

[56] References Cited

U.S. PATENT DOCUMENTS

| | | | |
|---|---|---|---|
| 985,826 | 3/1911 | McLaughlin | 411/278 |
| 1,384,019 | 7/1921 | Johnston et al. | |
| 2,380,994 | 8/1945 | Pummill | |
| 2,887,891 | 5/1959 | Perez | 74/230 |

FOREIGN PATENT DOCUMENTS

| | | | |
|---|---|---|---|
| 38199 | 4/1931 | France | |
| 721806 | 3/1932 | France | 411/155 |
| 2366480 | 1/1976 | France | |
| 1500548 | 12/1931 | Switzerland | 411/155 |
| 129476 | 7/1919 | United Kingdom | |
| 341333 | 1/1931 | United Kingdom | |
| 540864 | 11/1941 | United Kingdom | |
| 1027674 | 4/1966 | United Kingdom | |

Primary Examiner—Neill R. Wilson
Attorney, Agent, or Firm—Webb Burden Ziesenheim & Webb

[57] ABSTRACT

A locking nut assembly in which a dished washer (16) has a cylindrical bore (19) which is a close runner fit on the external cylindrical face (15) of a spigot (12) formed under the head (11) of the nut (10). In use the washer (16) is flattened, the bore (19) contracts and grips the spigot (12) which is thereby deformed inwardly so that the thread (14) within the spigot is forced into close contact with the complementary thread on a bolt with which the nut is used.

10 Claims, 2 Drawing Sheets

LOCKING NUT ASSEMBLY

DESCRIPTION OF INVENTION

This invention relates to locking-nut assemblies of the type consisting of a nut and a locking washer.

Very many different designs of locking-nut assemblies have been proposed and many are satisfactorily in use. However known assemblies may allow the nut to become loose in particularly arduous conditions. For example a rotary machine which rotates at a speed of up to 15000 rpm may be driven by a belt which engages a pulley mounted on the machine shaft. The end of the shaft is threaded and the pulley is held on the shaft against a shoulder by a locking-nut assembly. There is no driving formation such as a key, flat or taper on the shaft and the driving torque between the pulley and the shaft is dependent solely on the frictional forces generated by tightening the locking-nut assembly. Normally the shaft rotates clockwise and therefore the nut tends to tighten. However in certain circumstances rotation occurs in an anti-clockwise direction and this has a tendency to loosen conventional locking nut assemblies using either a split helical locking washer or a spring washer. If the nut loosens too far then it will not re-tighten when the pulley again rotates in a clockwise sense and drive between the pulley and shaft will be lost.

The conventional assemblies presently used rely for their effectiveness on the locking washer maintaining an axial force on the nut, when the latter tends to unscrew, which keeps the flanks of the complementary threads on the nut and the shaft in frictional engagement. This force is less, when the nut has slightly backed off from its fully tightened position, than when it is fully tight but is usually sufficient to prevent further unscrewing. However in arduous conditions such as mentioned above or in vibratory static conditions conventional locking-nut assemblies can come loose.

In addition to conventional designs using split helical or spring locking washers as mentioned above, there have been other more complex proposals which have formed the subjects of old patents but which, so far as the applicant is aware, have never been put into practice.

Thus GB A 341 333, which dates from 1931, describes a locking-nut assembly in which a nut has a spigot on which is mounted a conical washer. In one embodiment the spigot is of greater length than the thickness of the washer and acts as a stop to prevent flattening of the washer as the nut is tightened. In another embodiment the underside of the nut is conical and acts as a stop when the washer comes into contact with it. In both embodiments the stop acts to prevent flattening of the washer and so that the latter is not stressed beyond its elastic limit. The patent describes that the washer exerts a continuous high pressure on the nut to lock it. There are also frictional forces between the abutting faces of the nut and the washer and of the washer and the workpiece. There is a clearance between the bore of the washer and the spigot when the nut has been tightened.

In GB A 129 476, which dates from 1919, a separate nut and washer are disclosed. When the washer is flattened it frictionally engages the threads of the bolt under the nut. Thus the frictional locking effect of the conventional spring washer is enhanced by the additional frictional engagement of the washer with the threads of the bolt. In this arrangement there would in practice be great difficulty in removing the washer from the bolt in spite of what is said in the patent.

A somewhat similar but more complex arrangement is shown in GB A 1 027 674 in which a separate washer of a synthetic resin material is moulded about a spigot on the nut and when the nut is tightened down the washer is compressed axially and thus expands radially into engagement with the threads of the bolt on which the nut is mounted. Again the locking effect is caused by the flanks of the threads on the nut engaging the flanks of the threads on the bolt and the frictional forces between the washer and the bolt threads and between the washer on the one hand and the nut and the face of the workpiece on the other. This assembly would be too expensive for many mass production applications.

In U.S. Pat. No. 1,184,019, which dates from 1921, the nut has a spigot with an external conical face which engages an internal conical face on a locking washer. As the nut is tightened the conical faces telescope and the spigot is contracted to grip the threads of the bolt. The locking force is provided solely by the frictional engagement between the conical faces and apart from the inherent elasticity of the metal there are no spring forces involved so that, once a slight loosening has taken place, the locking effect would be lost.

Another proposal is to be found in GB A 540 864 in which one end of a nut is formed with a circumferential groove in which one limb of a generally L-section spring washer is received; each limb of the washer is frusto-conical. The limb of the washer in the groove engages a complementary frusto-conical surface on the internal wall of the groove. As the nut is tightened, the limb of the washer that is in the groove is pushed further into the groove and elastically strains the inner wall of the groove, which is slotted, to take up the clearance between the threads on the nut and those on the bolt. The need to mount the washer in a groove in the underside of the nut limits the thickness of the washer and thus the force that it can apply to the inner wall of the groove as the nut is tightened.

Moreover, due to the fact that the force applied to the limb of the washer in the groove as the nut is tightened is in a direction along the limb, due to the angles involved, the resolved component of this force which is applied by the washer to the inner wall of the groove will be small and thus the locking efficiency of the arrangement is low. Since the bodies of nuts have to be made to standard sizes the groove in the underside of the nut has to be formed within the standard depth of the nut so that the undeformed part of the thread in contact with the bolt is limited.

Finally in FR A 2 366 480 there is described a one piece nut and washer in which the washer forms a divergent extension of a spigot on the nut body. As the nut is tightened the divergence of the washer increases, the outer circumferential edge of the washer is trapped between the nut body and the workpiece and the spigot moves to take up the clearance between the threads in the spigot and those on the bolt. It is clear from the specification that only light locking is obtained by this take-up of thread clearance. It is also clear that, when the nut is fully tightened, the washer is not, and cannot be, flattened. Only the outer edge portion of the washer is gripped between the workpiece and the nut body, there is thus a small area of frictional contact and the locking force generated is correspondingly low.

The nut would be difficult and expensive to make and its locking effect would be low for the reasons set out above. Moreover, the nut and washer are of necessity made of the same material which could prevent one from choosing optimum different materials for the nut and washer respectively.

The object of the invention is to provide a simple, cheap and effective locking nut assembly which overcomes the disadvantages of those described above and which is particularly suitable for use in arduous conditions.

According to a first aspect of the invention we provide a locking-nut assembly comprising a nut having a head adapted for engagement by a driving tool, a spigot extending from one end of the head, a screw-threaded bore extending continuously through the head and the spigot, the spigot being of smaller cross-sectional dimensions than the head so that a generally annular shoulder is provided at the junction of the head and the spigot, the spigot consisting of a relatively thin wall bounded by said bore and by a cylindrical outer surface; and a separate dished washer mounted on the spigot: characterised in that the washer has a cylindrical bore which is a close running fit on the outer surface of the spigot, in that the spigot has a length equal to or slightly less than the thickness of the washer, in that the washer is mounted on the spigot with its convex face adjacent to the shoulder and in that, when a compressive force is applied to the assembly in a direction parallel to the longitudinal axis of the bore which is sufficient to flatten the washer, the spigot is gripped in the bore of the washer and the wall of the spigot is deformed inwardly by contraction of the bore of the washer.

The assembly of the invention is simple in that it uses easily manufactured parts. If desired, the nut can be forged and the washer stamped. Because the parts can be easily manufactured and assembled the assembly is cheap. It is effective in arduous conditions, e.g. those mentioned above because in addition to the frictional forces between the washer on the one hand and the nut and workpiece on the other, there is a large radial force on the spigot formed by the radial contraction of the bore of the washer as it is flattened which deforms the wall of the spigot into engagement with the threads of the bolt thus locking the nut in place. This radial force is assured because of the cylindrical bore of the washer and the close fit of this bore on the cylindrical outer wall of the spigot.

Such an effective radial force cannot be obtained by the locking washers of the prior art since none of them rely on the very large forces which can be obtained by contraction of the bore of a dished washer when it is flattened.

In addition the head or body of the nut can be made of the correct depth according to the appropriate standards with the spigot providing an extra length of threaded bore to engage the bolt. By this arrangement there is a full-length threaded engagement between the undeformed part of the threaded bore of the nut and the bolt in addition to the deformed part of the thread in the spigot.

Preferably the deformation of the spigot as the washer flattens is a plastic deformation which gives good protection against the nut coming loose even if the nut does slightly back off from its fully-tightened position.

Preferably the washer is made of a metal which has been treated so that the washer acts as a spring which recovers its initial shape when said compressive force is removed after flattening the washer. This enables the assembly to be re-used and the spring force applied between the nut and the workpiece as the nut is tightened enhances the locking effect. The washer may be made of hardened and tempered spring steel.

Preferably the outer peripheral edge of the concave surface of the washer is rounded. In the initial tightening of the assembly the nut can rotate relative to the washer but as tightening continues the washer will rotate with the nut and the rounded edge serves to keep damage to the workpiece to a minimum as final tightening takes place and the washer is flattened.

As has been stated above the assembly finds particular application in arduous conditions, particularly in rotary machines and according to another aspect of the invention therefore we provide the combination of a rotary machine having an externally threaded rotary spindle and a driving member mounted on the spindle against a shoulder thereon, with an assembly embodying the first aspect of the invention mounted on the spindle and tightened thereon so that said washer is substantially flat against a surface on said member thus to hold the member on the spindle so that driving torque can be transmitted between the spindle and the member.

This combination is particularly effective where there are no interfitting driving formations on the member and the spindle.

The invention will now be described by way of example with reference to the accompanying drawings, in which.

Figure 1:
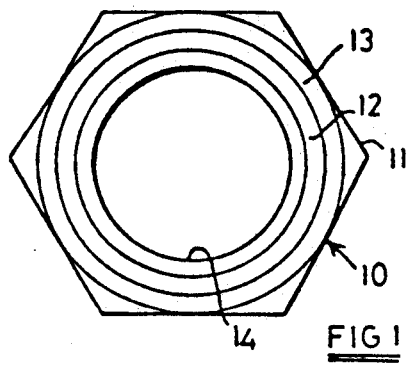
FIG. 1 is an under-plan view of a nut forming part of the assembly of the invention.
Figure 2:
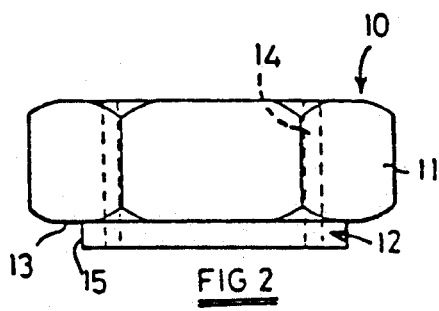
FIG. 2 is an elevation of the nut of FIG. 1.

Referring first to FIGS. 1 and 2, the nut is indicated generally at 10 and has a conventional hexagonal head 11 shaped for engagement by a spanner or driving tool. The head is made to the standard dimensions laid down for a nut of the appropriate size. Extending from one end of the head is a spigot 12; the length of the spigot increases the depth of the nut beyond the standard depth. A flat, generally annular shoulder 13 is provided on the head at the junction between the head 11 and the spigot 12. A threaded bore 14 extends continuously through the head and the spigot over the whole depth of the nut. The spigot has a relatively thin wall section which is bounded internally by the bore 14 and externally by a cylindrical outer surface 15. The wall of the spigot is continuous and forms a complete cylinder.

Figure 3:
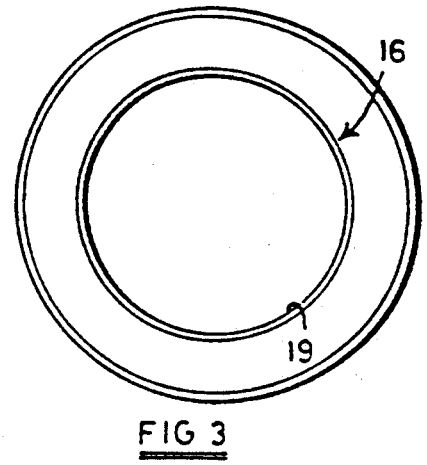
FIG. 3 is a plan of a dished washer forming the other part of said assembly.
Figure 4:
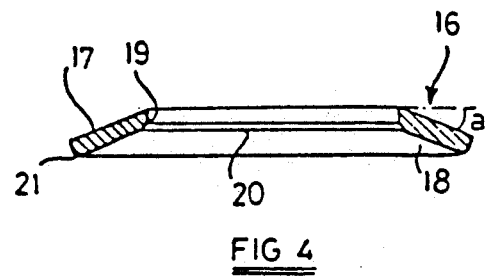
FIG. 4 is a section through the washer of FIG. 3.

Referring now to FIGS. 3 and 4 the washer is indicated generally at 16. The washer is formed to a dished shape having a convex face 17 and a concave face 18. The washer is provided with a cylindrical bore 19, described in more detail below, which at the end of the bore opening into the concave face 18 is provided with a countersink 20. The outer peripheral edge 21 of the concave surface of the washer is rounded.

Figure 5:
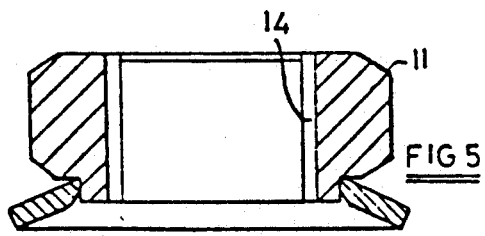
FIG. 5 is a section through the assembly.
Figure 6:
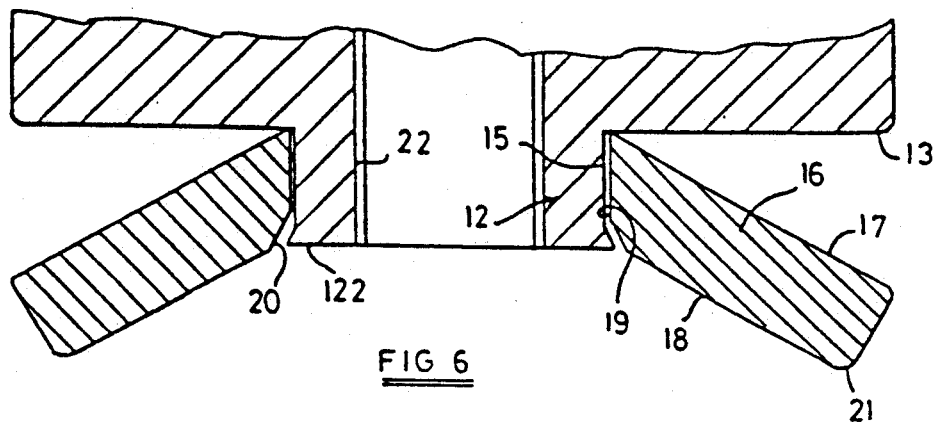
FIG. 6 is a detail section showing how the washer fits on the spigot of the nut when the assembly is unloaded.

Referring to FIG. 5, the assembly is made by placing the washer 16 on the spigot 12 and then staking the free end of the spigot to expand it slightly into the countersink 20 to hold the washer captive on the spigot as shown in FIG. 6. There is a close running fit between the cylindrical bore 19 of the washer and the cylindrical outer surface 15 of the spigot. The washer can thus rotate on the spigot and the staking is so carried out that it does not prevent such rotation.

Referring now to FIG. 6, this shows the way the washer 16 fits on the nut in more detail. It will be seen that the cylindrical bore 19 in the washer surrounds the cylindrical outer surface 15 of the spigot so that there is a small clearance 22 between the facing surfaces. This clearance is preferably no more than will allow the washer to turn freely on the nut. FIG. 6 shows the staked end 122 of the spigot and that this fits with clearance in the countersink 20 and so does not prevent the washer turning on the nut.

Figure 7:
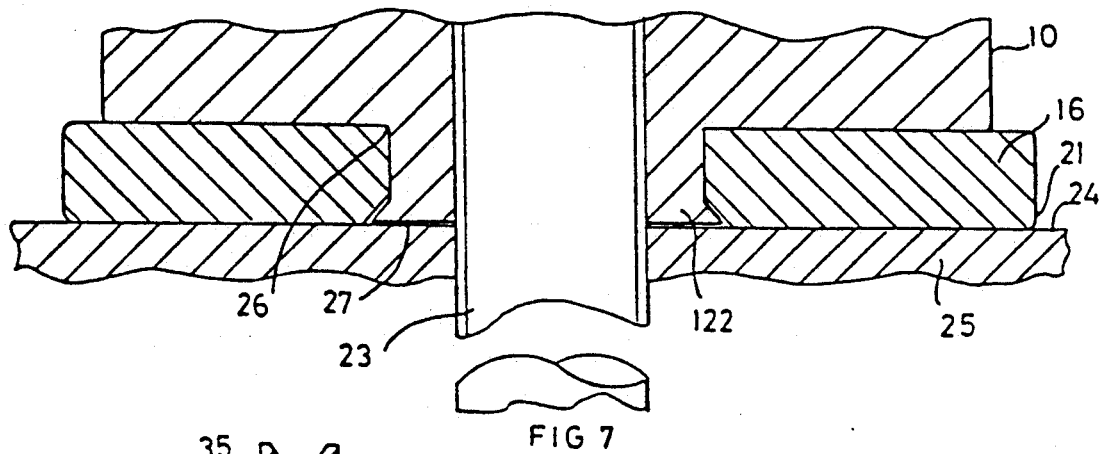
FIG. 7 is a section through the assembly in its loaded condition on a bolt.

Referring now to FIG. 7 this shows the assembly of the invention tightened down on a bolt 23 against a surface 24 on a workpiece 25. The nut is tightened down until the washer is flat as shown. During initial tightening, the edge 21 will be the first part of the washer to engage the surface 24, as tightening continues the nut will turn relative to the washer until the frictional forces between the face 17 and the shoulder 13 causes the washer to turn with the nut. When this happens, damage to the surface 24 will be minimised because the edge 21 is rounded.

As the washer approaches its flat state as shown in FIG. 7 the bore 19 contracts, grips the spigot 12 and plastically deforms the spigot inwardly thus forcing the threads in the part of the bore 14 which is in the spigot into close contact with the threads on the bolt. Since the bore 19 in the washer was cylindrical in the unloaded state of the washer as shown in FIG. 7, when the washer is flattened the bore converges upwardly away from the surface 24 in FIG. 7 so that the greatest deformation of the wall of the spigot will take place at 26 adjacent to the shoulder 13, however the clearance 22 will be such that the spigot wall is deformed over substantially the whole length thereof to give an excellent grip on the bolt threads.

It will be seen that the length of the spigot is approximately equal to and no greater than the thickness of the washer. This is important because as the assembly is tightened down the spigot must not engage the surface 24 to prevent the washer being flattened. Indeed the length of the spigot is preferably slightly less than the thickness of the washer so that in the fully tightened condition shown in FIG. 7 there is a clearance 27 between the end 122 of the spigot and the surface 24. The provision of such a clearance ensures that the washer can be fully flattened as the nut is tightened. Since the washer can be fully flattened it can apply the maximum inward force to the spigot due to the contraction of the bore of the washer and cause plastic deformation of the spigot.

In addition to the mutual locking of the bolt and nut threads in the spigot, additional locking effects are obtained due to the frictional forces between the faces of the washer and the abutting faces of the nut and the workpiece which are augmented by the forces caused by the strains in the washer.

The nut may be made of any desired material suitable for the duty it has to perform e.g. mild steel to SAE 1008 or SAE 1010 or high tensile steel to BS 311 Type 9 or a heat-treated steel to ISO 1012.

The washer is preferably a stamping and may be made of spring steel to CS 60, CS 70 or CS 80 in BS 1449, Part 1 hardened and tempered to 43 to 48 RC. The dish angle a of the washer is preferably 20° as shown in FIG. 4.

Figure 8:
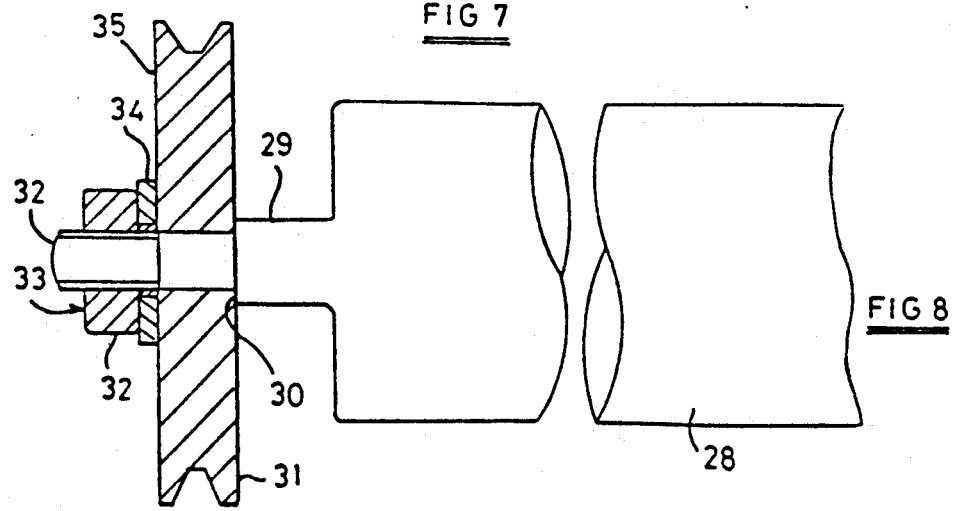
FIG. 8 is a diagrammatic view of a rotary machine having an assembly embodying the invention holding a driving pulley thereon.

FIG. 8 shows the assembly of the invention used on a rotary machine. The machine is shown generally at 28 and has a rotary shaft 29. The shaft has a shoulder 30 against which is mounted a driving Vee-belt pulley 31. The pulley is mounted on a reduced section threaded portion 32 of the shaft and is held in position against the shoulder by an assembly 33 embodying the invention. The washer 34 of the assembly 33 is flattened against a surface 35 on the pulley. Although there are no interfitting driving formations on the pulley and the shaft it has been found that drive is satisfactorily transmitted from the pulley to the shaft even if the latter sometimes rotates in an anti-clockwise direction, its normal driving sense being clockwise.

Tests have been carried out to compare the slippage torque of the pulley 31 in a rotary machine such as shown in FIG. 9 fitted with an assembly embodying the invention and a conventional nut and spring washer. In each case the nut used was 24 mm across flats with a length of 9.5 mm and a 17 mm thread. The nut was initially tightened to a torque of 60 lbft (81 Nm). In a first series of tests the shaft 29 was held stationary and torque applied to the pulley 31 in a clockwise sense, its normal direction of motion, until the pulley turned on the shaft.

| Sample No. | Slippage torque (lbft) | (Nm) |
| --- | --- | --- |
| Assemblies embodying the invention | | |
| 1 | 84 | 114 |
| 2 | 90 | 122 |
| 3 | 96 | 130 |
| 4 | 84 | 114 |
| 5 | 84 | 114 |
| Average | 87.6 | 118.8 |
| Conventional nut and spring washer; | | |
| 1 | 37 | 50 |
| 2 | 54 | 73 |
| 3 | 45 | 61 |
| 4 | 43 | 58 |
| 5 | 44 | 60 |
| Average | 44.6 | 60.5 |

In a second series of tests the torque was applied to the pulley in an anti clockwise sense tending to undo the nut, the slippage torques which were recorded are as follows:

| Sample No. | Slippage torque (lbft) | (Nm) |
| --- | --- | --- |
| Assemblies embodying the invention; | | |
| 1 | 58 | 79 |
| 2 | 74 | 100 |
| 3 | 66 | 90 |
| 4 | 70 | 95 |
| 5 | 61 | 83 |
| Average | 65.8 | 89.4 |
| Conventional nut and spring washer; | | |

-continued

| Sample No. | Slippage torque (lbft) | (Nm) |
| --- | --- | --- |
| 1 | 52 | 71 |
| 2 | 46 | 62 |
| Average | 49 | 66.5 |

It will be seen that, in the clockwise-rotation tests, assemblies embodying the invention had a performance more than 50% better than equivalent conventional nuts and spring washers. Moreover in the anti-clockwise tests where the torque is tending to undo the nut, assemblies embodying the invention performed very much better than equivalent conventional nut and washer assemblies in the clockwise tests, i.e. tests in which there is a tendency to tighten the nut.

The improvement in performance is unexpectedly good and is obtained by a simple and inexpensive assembly.

I claim:

1. A locking nut assembly comprising a nut having a head adapted for engagement by a driving tool, a spigot extending from one end of the head, a screw-threaded bore extending continuously through the head and the spigot, the spigot being of smaller cross-sectional dimensions than the head so that a generally annular shoulder is provided at the junction of the head and the spigot, the spigot consisting of a relatively thin wall bounded by said screw-threaded bore and by a cylindrical outer surface; and a separate dished washer having a convex face mounted on the spigot; characterised in that the washer has a cylindrical bore which is a close running fit on the outer surface of the spigot, in that the spigot has a length equal to or slightly less than the thickness of the washer, in that the washer is mounted on the spigot with its convex face adjacent to the shoulder, and in that, when a compressive force is applied to the locking nut assembly in a direction parallel to the longitudinal axis of the screw-threaded bore which is sufficient to flatten the washer, the spigot is gripped in the bore of the washer and the wall of the spigot is deformed inwardly by contraction of the bore of the washer.

2. An assembly according to claim 1, characterised in that the spigot is deformed plastically when the washer is flattened.

3. An assembly according to claim 1 or claim 2, characterised in that the washer is made of a metal which has been treated so that the washer acts as a spring which recovers its initial shape when said compressive force is removed after flattening the washer.

4. An assembly according to claim 3, characterised in that the washer is made of hardened and tempered spring steel.

5. An assembly according to claim 1 characterised in that the dish angle of the washer in its undeformed state is approximately 20°.

6. An assembly according to claim 1, characterised in that the outer peripheral edge of the concave surface of the washer is rounded.

7. An assembly according to claim 1, wherein the free end of the spigot is deformed to retain the washer on the nut.

8. An assembly according to claim 1, wherein the wall of the spigot is continuous and forms a complete cylinder.

9. The combination of a rotary machine having an externally threaded rotary spindle and a drive member mounted on the spindle against the shoulder thereon, a locking nut assembly mounted on the spindle and tightened thereon, said locking nut assembly comprising a nut having a head adapted for engagement by a driving tool, a spigot extending from one end of the head, a screw-threaded bore extending continuously through the head and the spigot, the spigot being of smaller cross-sectional dimensions than the head so that a generally annular shoulder is provided at the junction of the head and the spigot, the spigot consisting of a relatively thin wall bounded by said screw-threaded bore and by a cylindrical outer surface; and a separate dished washer having a convex face mounted on the spigot; so configured such that the washer has a cylindrical bore which is a close running fit on the outer surface of the spigot, the spigot has a length equal to or slightly less than the thickness of the washer, the washer is mounted on the spigot with its convex face adjacent to the shoulder, and when a compressive force is applied to the locking nut assembly in a direction parallel to the longitudinal axis of the screw-threaded bore which is sufficient to flatten the washer, the spigot is gripped in the bore of the washer and the wall of the spigot is deformed inwardly by contraction of the bore of the washer, whereby the washer substantially flat against the surface on said drive member holds the drive member on the spindle so that torque can be transmitted between the spindle and the drive member.

10. The combination according to claim 9, wherein there are no interfitting driving formations on the member and the spindle.

* * * * *